(12) United States Patent
Tasher et al.

(10) Patent No.: US 10,754,988 B2
(45) Date of Patent: Aug. 25, 2020

(54) ANTI-ROLLBACK VERSION UPGRADE IN SECURED MEMORY CHIP

(71) Applicant: Winbond Electronics Corporation, Taichung (TW)

(72) Inventors: Nir Tasher, Tel Mond (IL); Itay Admon, Tel Aviv (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 254 days.

(21) Appl. No.: 15/670,062

(22) Filed: Aug. 7, 2017

(65) Prior Publication Data

US 2018/0060607 A1 Mar. 1, 2018

Related U.S. Application Data

(60) Provisional application No. 62/381,028, filed on Aug. 30, 2016.

(51) Int. Cl.
*G06F 21/64* (2013.01)
*G06F 21/57* (2013.01)
*G06F 8/65* (2018.01)
*G06F 21/60* (2013.01)
*H04L 9/32* (2006.01)

(52) U.S. Cl.
CPC ............... *G06F 21/64* (2013.01); *G06F 8/65* (2013.01); *G06F 21/57* (2013.01); *G06F 21/602* (2013.01); *H04L 9/3247* (2013.01)

(58) Field of Classification Search
CPC .......... G06F 21/64; G06F 8/65; G06F 21/602; G06F 21/57; H04L 9/3247
See application file for complete search history.

(56) References Cited

U.S. PATENT DOCUMENTS

| 7,761,922 | B1 * | 7/2010 | Baum | G06F 21/10 726/26 |
| 8,745,612 | B1 * | 6/2014 | Semenzato | G06F 8/65 717/170 |
| 9,940,123 | B1 * | 4/2018 | Ayoub | G06F 8/65 |
| 2003/0163664 | A1 * | 8/2003 | Kanda | G06F 8/654 711/202 |
| 2006/0069849 | A1 * | 3/2006 | Rudelic | G06F 12/0246 711/103 |

(Continued)

*Primary Examiner* — Michael Pyzocha
(74) *Attorney, Agent, or Firm* — Kligler & Associates Patent Attorneys Ltd (57) ABSTRACT

A secured storage system includes a non-volatile memory and a controller. The non-volatile memory is configured to store a first data item and a respective first version identifier assigned to the first data item. The controller is configured to receive a second data item accompanied by a second version identifier and a signature, for replacing the first data item in the non-volatile memory, to authenticate at least the second version identifier using the signature, to make a comparison between the stored first version identifier and the second version identifier, and to replace the first data item with the second data item only in response to verifying that (i) the second version identifier is authenticated successfully, and (ii) the second data item is more recent than the first data item, as indicated by the comparison between the stored first version identifier and the authenticated second version identifier.

19 Claims, 4 Drawing Sheets

(56) References Cited

U.S. PATENT DOCUMENTS

| | | | |
|---|---|---|---|
| 2007/0168668 A1* | 7/2007 | Chang | G06F 21/572 713/176 |
| 2007/0226412 A1* | 9/2007 | Morino | G06F 21/10 711/113 |
| 2008/0027587 A1* | 1/2008 | Nickerson | A01G 25/16 700/284 |
| 2008/0307507 A1* | 12/2008 | Conley | G06F 21/606 726/4 |
| 2009/0100272 A1* | 4/2009 | Smeets | G06F 21/121 713/189 |
| 2010/0229167 A1* | 9/2010 | Dow | G06F 11/008 717/170 |
| 2011/0185112 A1* | 7/2011 | Goss | G06F 12/0246 711/103 |
| 2011/0208975 A1* | 8/2011 | Sibert | G06F 8/65 713/189 |
| 2011/0258409 A1* | 10/2011 | Ebihara | G06F 21/79 711/163 |
| 2012/0246442 A1* | 9/2012 | Dolgunov | G06F 11/1415 711/209 |
| 2012/0272038 A1* | 10/2012 | Wei | G06F 3/0613 711/206 |
| 2013/0227538 A1* | 8/2013 | Maruyama | G06F 8/65 717/168 |
| 2014/0130151 A1* | 5/2014 | Krishnamurthy | G06F 8/65 726/22 |
| 2014/0250290 A1* | 9/2014 | Stahl | G06F 21/575 713/2 |
| 2014/0258736 A1* | 9/2014 | Merchan | G06F 21/62 713/193 |
| 2015/0067211 A1* | 3/2015 | Inooka | G06F 13/126 710/110 |
| 2015/0074339 A1* | 3/2015 | Cheriton | G06F 12/0804 711/103 |
| 2015/0100955 A1* | 4/2015 | Chen | G06F 8/658 717/170 |
| 2015/0162065 A1* | 6/2015 | Kim | G11C 11/40615 365/222 |
| 2015/0200804 A1* | 7/2015 | Lee | H04L 41/082 709/221 |
| 2015/0261975 A1* | 9/2015 | Brumley | H04L 9/3242 713/193 |
| 2015/0331691 A1* | 11/2015 | Levitan | G06F 9/3848 712/240 |
| 2016/0019111 A1* | 1/2016 | Kochar | G06F 11/1068 714/6.12 |
| 2016/0028725 A1* | 1/2016 | Benoit | H04L 63/0869 726/14 |
| 2016/0036913 A1* | 2/2016 | Romem | G06F 15/167 709/219 |
| 2016/0117660 A1* | 4/2016 | Prakash | H04W 4/70 705/14.64 |
| 2016/0124740 A1* | 5/2016 | Choi | G06F 8/654 717/168 |
| 2016/0147651 A1* | 5/2016 | Desai | G06F 12/0246 711/103 |
| 2016/0267015 A1* | 9/2016 | Li | G06F 12/10 |
| 2016/0274792 A1* | 9/2016 | Ogawa | G06F 3/061 |
| 2016/0283750 A1* | 9/2016 | Durham | G06F 21/79 |
| 2017/0010881 A1* | 1/2017 | Kawazu | G06F 8/65 |
| 2017/0177873 A1* | 6/2017 | Raghuram | G06F 21/53 |
| 2017/0277530 A1* | 9/2017 | Adams | G06F 8/65 |
| 2018/0026940 A1* | 1/2018 | Sastri | H04L 63/06 711/202 |
| 2018/0032731 A1* | 2/2018 | De | G06F 21/565 |
| 2018/0365449 A1* | 12/2018 | Meriac | G06F 21/74 |
| 2019/0340379 A1* | 11/2019 | Beecham | G06F 16/9014 |

\* cited by examiner

ANTI-ROLLBACK VERSION UPGRADE IN SECURED MEMORY CHIP

CROSS-REFERENCE TO RELATED APPLICATIONS

This application claims the benefit of U.S. Provisional Patent Application 62/381,028, filed Aug. 30, 2016, whose disclosure is incorporated herein by reference.

TECHNICAL FIELD

Embodiments described herein relate generally to data storage, and particularly to methods and systems for secured version upgrade in a memory chip.

BACKGROUND

In various portable and other devices, a processor is coupled to a memory chip and executes a computer program stored in the memory chip. In some devices of this sort, the memory chip manages data storage in a secured manner.

SUMMARY

An embodiment that is described herein provides a secured storage system that includes a non-volatile memory and a controller. The non-volatile memory is configured to store a first data item and a respective first version identifier assigned to the first data item. The controller is configured to receive a second data item accompanied by a second version identifier and a signature, for replacing the first data item in the non-volatile memory, to authenticate at least the second version identifier using the signature, to make a comparison between the stored first version identifier and the second version identifier, and to replace the first data item with the second data item only in response to verifying that (i) the second version identifier is authenticated successfully, and (ii) the second data item is more recent than the first data item, as indicated by the comparison between the stored first version identifier and the authenticated second version identifier.

In some embodiments, the controller is configured to (i) authenticate at least the version identifier to produce an authentication result, (ii) make the comparison, and (iii) conditionally replace the first data item with the second data item based on the authentication result and on the comparison, in a single uninterruptible operation. In other embodiments, the controller is configured to authenticate the second version identifier by verifying the signature based on a secret key that the controller shares with a provider of the second data item. In yet other embodiments, the controller is configured to calculate the signature for the received second data item to produce a calculated signature, based on the secret key and on at least the second version identifier, and to check whether or not the calculated signature matches the received signature.

In an embodiment, the first data item occupies a first physical storage location in a physical address space of the non-volatile memory, and the controller is configured to allocate for the second data item a second physical storage location in the physical address space, to map between physical addresses of the first physical storage location and logical addresses of a first logical storage location in a logical address space used by the storage system, and to map between physical addresses of the second physical storage location and logical addresses of a second logical storage location in the logical address space. In another embodiment, the controller is configured to replace the first data item with the second data item by writing the second data item to the second physical storage location of the non-volatile memory via the second logical storage location. In yet another embodiment, the controller is configured to replace the first data item with the second data item by re-mapping logical addresses of the first logical storage location to physical addresses of the second physical storage location for reading the second data item.

In some embodiments, the controller is configured to assign a write protection indicator for locking and unlocking for writing the second physical storage location, to unlock the second physical storage location before writing the second data item to the second physical storage location, and to lock the second physical storage location after concluding writing the second data item to the second physical storage location. In other embodiments, the controller is configured to write the second data item to the second physical storage location by sending to the non-volatile memory multiple write commands that each carries a respective part of the second data item. In yet other embodiments, each of the write commands includes a respective command signature calculated using a secret key associated with the second data item, and the controller is configured to execute each write command only after verifying the respective command signature using the secret key that is associated with the second data item.

In some embodiments, the signature is calculated over both the second data item and the second version identifier, and the controller is configured to execute the write command only after validating that the second version identifier of the respective command signature is more recent than the first version identifier. In other embodiments, the controller is configured to store the second version identifier, in the non-volatile memory, for comparing between the second version identifier and a version identifier of a subsequent version update.

There is additionally provided, in accordance with an embodiment that is described herein, a method for secured storage, including, storing a first data item and a respective first version identifier assigned to the first data item a non-volatile memory in a storage system. A second data item, accompanied by a second version identifier and a signature, is received for replacing the first data item in the non-volatile memory. At least the second version identifier is authenticated using the signature. A comparison is made between the stored first version identifier and the authenticated second version identifier. The first data item is replaced with the second data item only in response to verifying that (i) the second version identifier is authenticated successfully, and (ii) the second data item is more recent than the first data item, as indicated by the comparison between the stored first version identifier and the authenticated second version identifier.

These and other embodiments will be more fully understood from the following detailed description of the embodiments thereof, taken together with the drawings in which:

DETAILED DESCRIPTION OF EMBODIMENTS

Overview

Embodiments that are described herein provide methods and systems for secure data storage in a storage system. The storage system may comprise a memory chip or a storage system of any other suitable type such as, for example, a Solid-State Drive (SSD). In the description that follows we refer mainly to an example storage system that comprises a memory chip. The memory chip comprises a memory controller and a non-volatile memory device such as a Flash memory device. The memory chip can be used in various user devices such as, for example, a Personal Computer (PC), a cellular phone, or an Internet of Things (IOT) node.

In some embodiments, the memory chip stores data items for a processor of the user device in the non-volatile memory, and retrieves the data items for the processor on demand. A data item may comprise, for example, executable code, such as an application program or a booting code of an underlying operating system. Alternatively or additionally, data items of other suitable types can also be used. Other types of data items may include keys and other cryptographic information, passwords and identification credentials, fingerprint and other biometric data, banking and finance data, electronic wallet, medical data, other personal information, and the like.

A data item stored in the non-volatile memory may require updating from time to time. For example, the version of an application program currently stored may be replaced with an advanced version that includes bug fixes, recently added features and the like.

Updated releases of a data item are sometimes available for download from a remote server. In principle, the memory chip can share with an authorized provider of a data item a secret key that the authorized provider uses for signing releases of the data item, and the memory chip uses for verifying the integrity and authenticity of downloaded data items. The authorized provider shares a secret key with the memory chip.

The updating scheme described above may be vulnerable to a roll-back attack, in which an attacker attempts to install in the memory chip a previously-captured data item that was signed by the authorized provider using the correct secret key, but released by the authorized provider earlier than the data item currently stored. The attacker may launch a roll-back attack (also referred to as a zero day attack) with the intention of exploiting previously known vulnerabilities of a previous version of the application code.

In some disclosed embodiments, data items received for storage in the memory chip are assigned version identifiers. Typically, an authorized provider releases updates of a given data item in some releasing order, and assigns respective version identifiers to the released updates in accordance with the releasing order.

In some embodiments, the memory controller receives a data item for replacing a stored data item in the non-volatile memory. The memory controller replaces the stored data item with the received data item only in response to verifying that (i) the version identifier of the received data item is authenticated successfully, and (ii) the received data item is more recent than the stored data item, based on a comparison between their respective version identifiers. In some embodiments, the data item and the version identifier are signed together in a common signature, and the memory controller authenticates the data item using this common signature.

In some embodiments, the memory controller receives with the data item a respective signature. The memory controller calculates for the received data item a calculated signature using the shared secret key. The memory controller verifies that the version identifier of the received data item is authentic by checking whether or not the calculated signature matches the signature of the received data item.

In some embodiments, the memory controller maps between logical addresses used by a host of the memory chip and physical addresses used by the non-volatile memory device. In the physical address space, the memory controller allocates for the data item a storage space for the currently used version and another storage space for writing an updated version of the data item. After validating the updated version, as described above, the memory controller re-maps the logical-to-physical addresses to swap roles between the two storage spaces.

In some embodiments, to write a data item to a storage space, the memory controller unlocks this storage space before writing, and locks the storage space after writing the data item concludes. In other embodiments, the memory controller writes a data item by sending to the non-volatile memory multiple write commands, such that each command carries a respective part of the data item content, and each command is signed with a respective signature. The non-volatile memory executes each of the write commands only after validating the respective signatures.

In some embodiments, the memory controller authenticates the received version identifier and validates that received data item is more recent than the stored data item, based on the respective version identifiers, in a single atomic operation that is uninterruptible. Such embodiments ensure that the actual update is allowed only if all the required conditions are satisfied.

The disclosed techniques support secure data storage in a memory chip. Using the disclosed techniques, no complex chain of trust is required, and data items in the memory chip can be updated securely and efficiently, incurring minimal latency.

System Description

Figure 1:
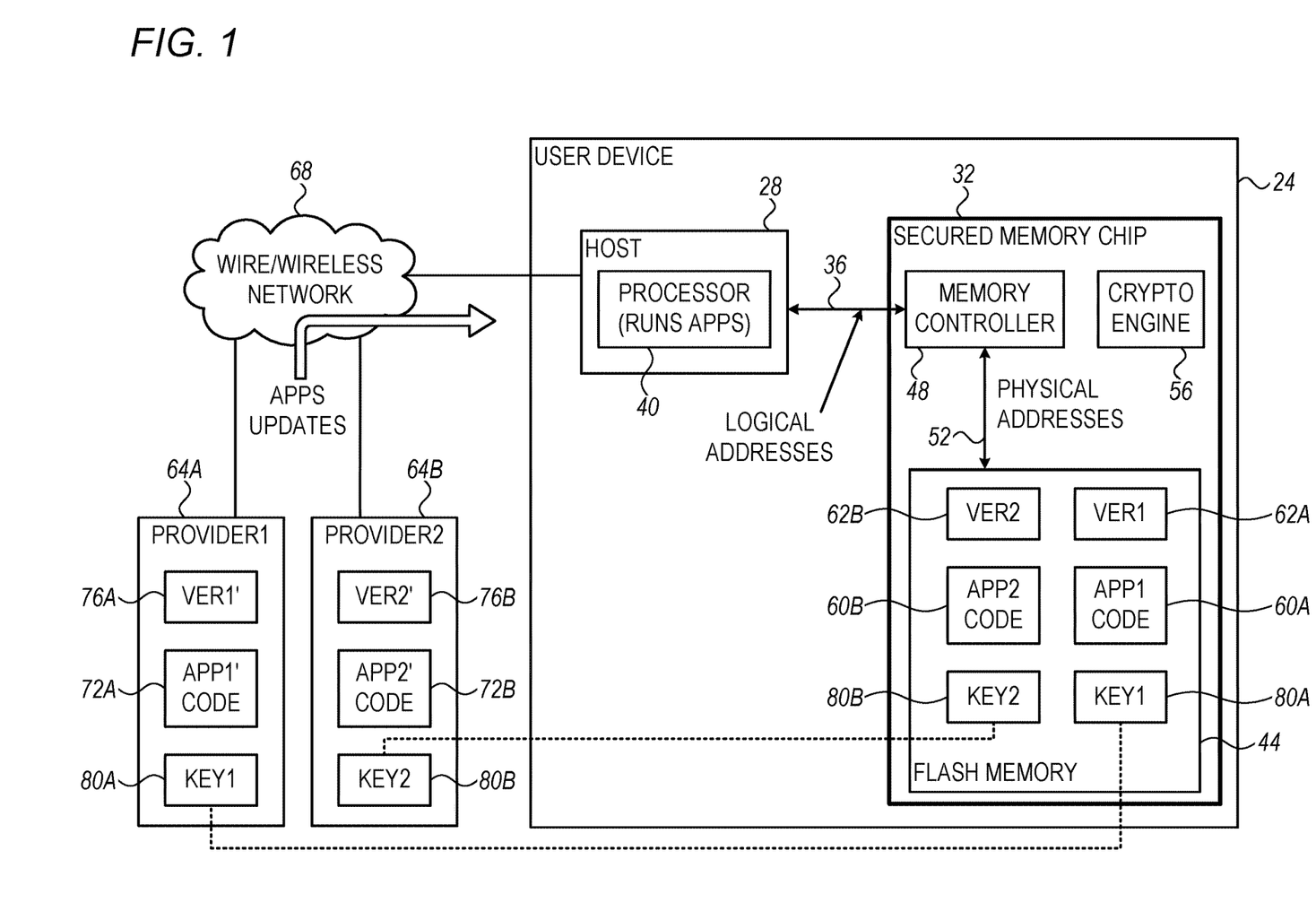
FIG. 1 is a block diagram that schematically illustrates a user device receiving updates to be securely stored in a local memory chip, in accordance with an embodiment that is described herein.

FIG. 1 is a block diagram that schematically illustrates a user device 24 receiving updates to be securely stored in a local memory chip 32, in accordance with an embodiment that is described herein. User device 24 comprises a host 28, coupled to memory chip 32 of the user device via a communication bus or link 36. Memory chip 32 stores data for the host in a non-volatile memory 44, a Flash memory in the present example. Memory chip 32 supports updating information stored in non-volatile memory 44 in a secured manner, as will be described in detail below.

Memory chip 32 can be used in various user host systems and devices, such as in computing devices, Personal Computers (PCs) or computer servers, cellular phones or other communication terminals, laptop computers, tablet computers, removable memory modules, Solid State Disks (SSD), storage devices such as hard disks, Secure Digital (SD) cards, Multi-Media Cards (MMC) and embedded MMC (eMMC), digital cameras, music and other media players, IOT nodes and/or any other system or device in which data is stored and retrieved.

Host 28 comprises a processor 40 that typically executes programs, such as, for example, an operating system, a boot-loader function, firmware, one or more user application programs, a communication stack, and the like. User device 24 typically comprises means for interfacing between processor 40 and a human user such as a keyboard or a touch pad, and a display (not shown). Host 28 comprises means for communication with remote servers, as will be described below.

Non-volatile memory 44 typically comprises a plurality of memory cells (not shown). In the present example, non-volatile memory 44 comprises a Flash memory, but alternatively may be implemented using any other suitable technology. The storage capacity of non-volatile memory 44 depends on the storage requirements of the hosting user device and may be on the order of several Megabits or even several Gigabits.

Memory chip 32 comprises a memory controller 48 that manages data storage in non-volatile memory 44. Memory controller 48 is coupled to non-volatile memory 44 via an internal communication bus or link 52 comprising any suitable communication bus. In memory chip 32, any information transmitted over communication bus 52 between the memory controller and the non-volatile memory is inaccessible outside memory chip 32.

Although non-volatile memory 44 may comprise multiple physical memory banks, the memory controller accesses the non-volatile memory as a unified logical memory.

In some embodiments, host 28 operates in an address space comprising logical addresses, whereas non-volatile memory 44 operates in a different address space comprising physical addresses. In storing and retrieving data to and from the non-volatile memory, the memory controller translates between the logical and physical addresses, as will be described in detail with reference to FIG. 2 below.

Communication bus 36 between the host and the memory chip may comprise any suitable bus or link operating in accordance with any suitable protocol. Communication bus 36 may comprise, for example, a Serial Peripheral Interface (SPI) bus or an Inter-Integrated Circuit (I2C bus). Communication bus 36 may operate as a serial bus or as a parallel bus, sending and receiving information at any suitable rate. An SPI bus and similarly an I2C bus may operate at bitrates of several Kbps to several Mbps (e.g., over 400 Mbps in 50 MHz-based Octal SPI bus). Serial ATA (SATA) and (Integrated Drive Electronics) IDE buses typically operate at bitrates of several hundred Mbps.

In the example embodiment of FIG. 1, memory chip 32 comprises a cryptographic engine 56, for implementing various security aspects of the memory chip, as will be described in detail below. In an embodiment, cryptographic engine 56 offloads the memory controller from the burden of applying complex cryptographic operations, such as encryption, decryption, authentication, data hashing, signature validation, and the like. In alternative embodiments, the memory controller performs some or all of the required cryptographic operations.

In some embodiments, the traffic communicated between host 28 and memory chip 32 over communication bus 36 is secured. In such embodiments, each of host 28 and memory controller 48 encrypts data to be sent over communication bus 36 (using any suitable encryption method), and decrypts data received encrypted from communication bus 36. Encrypting the traffic over communication bus 36 ensures that an attacker that may gain access to communication bus 36 is unable to decipher the information transmitted. Other security aspects of communicating over communication bus 36 include authenticity verification based on signatures, and integrity verification based on a cyclic redundancy check (CRC) code, a hash function, a signature or any other suitable integrity-check method.

Host 28 may store data in memory chip 32, and retrieve the data on demand. The stored data typically comprises one or more data items of any suitable type such as, for example, executable code such as an operating system, a booting code of the operating system or user application programs. Other relevant data types include secret Keys, identification credentials, user data, firmware, various drivers and the like.

In the example of FIG. 1, non-volatile memory 44 stores two application programs 60A and 60B denoted APP1 and APP2, respectively, to be executed by processor 40 of the host. In some embodiments, for executing an application program such as APP1 or APP2, the host reads the code of the application program from non-volatile memory 44, e.g., by sending to memory chip 32 a suitable read command.

Non-volatile memory 44 additionally stores for each application program 60A and 60B a respective version identifier 62A (denoted VER1) or 62B (denoted VER2). The memory controller uses the version identifiers for verifying that only updates of data items that are authentic and more recent than their currently stored counterparts will be installed, as will be described below.

An initial version of each data item, as well as updated versions of the data item, e.g., of application programs APP1 and APP2, can typically be downloaded by user device 24 over a communication network 68. In the example of FIG. 1, a provider 64A (denoted PROVIDER1) stores an updated version denoted APP1' 72A of application program APP1 60A, and a provider 64B (denoted PROVIDER2) stores an updated version APP2' 72B of application program APP2 60B. Providers 64 typically store one or more versions of each data item in a server that connects to communication network 68.

Communication network 68 may comprise, for example, a packet network such as, for example, an Ethernet or Internet Protocol (IP) network. Alternatively, communication network 68 may operate in accordance with any other suitable standard or protocol. Communication network 68 may comprise a wire network, e.g., a Local Area Network (LAN) or a Wide Area Network (WAN), or a wireless network, e.g., a cellular network or a wireless LAN such as a Wi-Fi network. Further alternatively or additionally, communication network 68 combines wire and a wireless networks.

In some embodiments, instead of (or in addition to) interfacing to communication network 68, user device 24 comprises one or more dedicated interfaces (not shown) for receiving an initial version or an updated version of a data item, in a direct manner. For example, the memory device may download a data item stored in a Compact Disc (CD) storage, or in a Universal Serial Bus (USB) storage device.

Each provider 64 may occasionally update a data item locally stored in the provider's server. For example, provider 64A (or 64B) may issue an updated version of application program APP1 (or APP2) that fixes problems in the functionality of the application program, e.g., solves security risks, and/or adds new features to the application program. When, for example, an updated version APP1' (72A) becomes available at the provider side, user device 24 may download the updated version over communication network 68 for replacing APP1 (60A) that is currently stored in non-volatile memory 44.

In some embodiments, each provider 64 assigns to its locally stored versions of the data item respective version identifiers. In the present example, provider 64A assigns a version identifier 76A (denoted VER1') to APP1' and provider 64B assigns a version identifier 76B (denoted VER2') to APP2'.

Each of providers 64 assigns version identifiers to a respective data item in a sequence of an increasing order. As such, a more recent version of the data item is assigned a more advanced version identifier in the sequence. For example, assuming that provider 64A issues version identifiers in some order, since APP1' (72A) is an updated version of APP1 (60A), provider 64A assigns to APP1' version identifier VER1' (76A) that is more advanced in the order than version VER1 (62A) of APP1. In some embodiments, the version identifiers comprise version numbers. In such embodiments, the assigned version numbers satisfy VER1'>VER1. Similar principles of assigning version identifiers apply to application program APP2 and to data items of any other suitable type.

User device 24 downloads an updated version of a data item accompanied by its version identifier. In the present example, user device 24 downloads APP1' with VER1' and APP2' with VER2'. The memory controller compares between the received and stored version identifiers of the relevant data item, and allows installing in the non-volatile memory only authenticated versions that are more recent than the stored versions, as will be described in detail below.

In some embodiments, the memory controller authenticates the version identifier of a downloaded data item using a secret key that is shared with an authorized provider of the data item. In the description that follows, the term "authorized provider" refers to a provider of a data item for which the memory chip shares a secret key.

In the example of FIG. 1, memory chip 32 shares a secret key 80A (denoted KEY1) with provider 64A of APP1 (and APP1'), and a secret key 80B (denoted KEY2) with provider 64B of APP2 (and APP2'). Each provider 64 uses the secret key for signing the respective data item with a signature, and memory chip 32 authenticates the received data item and its version identifier by verifying the signature using the secret key. Keys 80 are typically stored in non-volatile memory 44, and are accessible only within memory chip 32, e.g., by memory controller 48 and/or cryptographic engine 56.

Although in FIG. 1 each data item (application programs APP1 and APP2) is associated with a respective secret key, this assignment is not mandatory. For example, two or more data items, or even all of the data items authenticated by the memory chip, can be associated with a common secret key. As another example, one or more user devices can share a given secret key with user device 24. Secret keys 80 are typically initialized during production of memory chip 32 or at a later time, e.g., by the manufacturer of the memory chip or of the user device. Alternatively, a user of user device 24 initializes secret keys 80. After being initialized, the secret key cannot be read or over-written via any of the designed interfaces of the memory chip or of the user device.

Secure Access Control in Memory Chip

Figure 2:
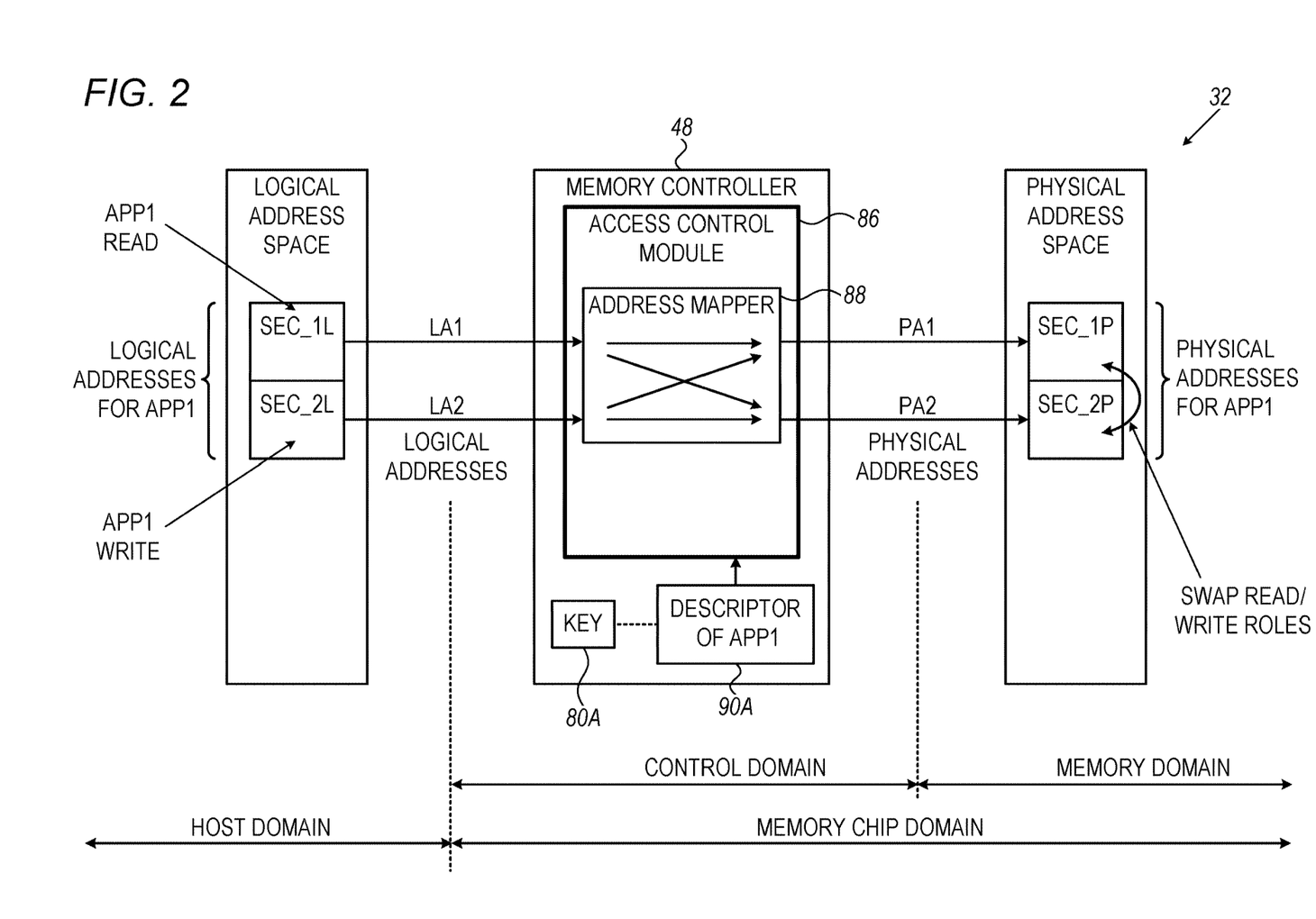
FIG. 2 is a block diagram that schematically illustrates the memory controller of the memory chip of FIG. 1, in accordance with an embodiment that is described herein.

FIG. 2 is a block diagram that schematically illustrates memory controller 48 of memory chip 32 of FIG. 1, in accordance with an embodiment that is described herein. The example in FIG. 2 refers mainly to applying access control to application program APP1 (60A in FIG. 1), but applies similarly to other suitable application programs and data items.

Memory controller 48 comprises an access control module 86 for managing secured access to non-volatile memory 44. In some embodiments, to manage the storage and access control, the memory controller assigns respective descriptors to at least some of the data items stored in the non-volatile memory, e.g., the memory controller assigns descriptor 90A to application program APP1. In an embodiment, the memory controller stores the descriptors in the non-volatile memory. The descriptors, e.g., descriptor 90A, typically comprise multiple fields such as those listed herein:

Address

Size (e.g., in bytes)

Version identifier (e.g., a version number)

Signature of the data item

Status

Accessing rights: e.g., read-protection and write-protection indicators.

The address field in the descriptor may include physical addresses, logical addresses, or both. The address field is typically used for identifying one or more storage locations. The status field can be used for control and management, e.g., in for holding the authentication status (e.g., pass or fail) and addresses swapping status.

In some embodiments, a given data item such as APP1 occupies multiple storage spaces in the non-volatile memory, as will be described below. The descriptors may comprise separate sets of values for at least some of the fields per each of the storage spaces assigned to the data item. To enable (or disable) a data item (e.g., APP1) for read, the memory controller sets (or clears) the relevant read-protection indicator. Similarly, to enable (or disable) writing or updating the data item in the non-volatile memory, the memory controller sets (or clears) the relevant write-protection indicator. When the memory controller requests access to the data item, access control module 86 checks the accessing rights in the respective descriptor, e.g., in descriptor 90A of APP1, and allows or prevents access, accordingly.

The memory controller can set different accessing rights to the different storage spaces of the data item. The operations of preventing and allowing access to a storage space are referred to herein as "locking," and "unlocking" operations, respectively. For example, for some time period, the memory controller may unlock one storage space of a data item only for reading, and unlock another storage space of the same data item only for writing.

Each descriptor may be associated with a respective secret key. FIG. 2 depicts KEY1 80A, which is associated with respective descriptor 90A of application program APP1 60A. Alternatively, a data item and its respective descriptor may be associated with different respective secret keys. In some embodiments, gaining access to the fields of a descriptor (e.g., 90A) requires knowledge of the respective secret key (e.g., 80A).

In some embodiments, the memory controller stores a data item (e.g., APP1) in a storage space together with a respective signature. In some embodiments, the memory controller stores the signature in a field of the descriptor assigned to the data item. The memory controller uses the stored signature to verify the integrity of the data item in the relevant storage space. To this end, the memory controller calculates the signature, and compares the calculated signature to the stored signature. The memory controller decides that the data item has not been tampered with (i.e., the integrity check has passed successfully) in response to detecting that the calculated signature matches the stored signature.

The memory controller may calculate the signature corresponding to a data item in a respective storage space, in various ways. In some embodiments, the memory controller calculates the signature by calculating a suitable cryptographic hash function, a SHA hash function, over the storage space. In some embodiments, the memory controller calculates the signature over the data item and its respective version identifier using the secret key associated with the data item. Alternatively, the memory controller calculates the signature using any suitable symmetric key encryption method (using the relevant secret key), e.g., the Advanced Encryption Standard (AES) method configured to operate, for example, in the Cipher Block Chaining (CBC) mode.

In some embodiments, the memory controller validates a data item stored in the non-volatile memory (e.g., using signatures as described above) in response to receiving a suitable validation command from processor 40. Alternatively or additionally, the relevant descriptor may include a validation field that instructs the memory controller to validate the respective data item over a respective storage space in which the currently used version of the data item is stored. For example, upon concluding a restarting process of the memory chip, the user device or both, the memory controller scans the descriptors of the currently stored data items, and validates data items that are indicated for validation in the respective descriptor.

In some embodiments, the memory controller receives from processor 40 a storage command destined to a given data item, wherein the storage command was signed by the provider that has the secret key associated with the descriptor of the given data item. The storage command may comprise, for example, a command for locking or unlocking a storage space of the given data item, a command for validating the data item in a respective storage space, or any other suitable storage command. In such embodiments, the memory controller verifies the authenticity of the storage command, using the secret key, prior to executing the storage command.

In some embodiments, the memory controller unlocks for writing a storage space in which an updated version of the respective data item is to be written, and locks this storage space when writing the updated version concludes. For example, before writing an updated version of APP1 to the non-volatile memory, the memory controller unlocks for writing one of storage spaces SEC_1P or SEC_2P.

In some embodiments, to avoid unlocking the storage space for a relatively long time, the memory controller writes the updated version of the data item to the relevant storage space by sending to the non-volatile memory multiple write commands that each is signed using the secret key associated with the respective data item. The non-volatile memory writes the updated version by verifying the signature of each write command, and executing the write commands only after authenticating the write commands based on their respective signatures. In an embodiment, the signature is calculated over both the second data item and its respective version identifier. In such embodiments, the memory controller executes the write command only after validating that the version identifier of the respective signature of the write command is more recent than the version identifier of the currently used version of the data item.

In some embodiments, each write command (comprising e.g., 16 bytes) is signed separately, and the memory controller receives, in addition, the verification identifier and address information within signed commands. The memory controller receives a full update "package" that includes multiple write commands, followed by a signed "roll-back protection" command. The memory controller stores the data carried by the verified write commands to the non-volatile memory, and then executes the rollback protection command to authenticate the entire data item written. The memory controller finally swaps the logical-to-physical address mapping to replace the data item stored with the updated version of the data item.

Access control module 86 comprises an address mapper that maps between logical addresses in a logical address space used by host 28, and physical addresses in a physical address space used in non-volatile memory 44. Processor 40 of the host applies storage operations to chip memory 32 using logical addresses, and is typically unaware of the physical addresses to which the logical addresses are mapped. In an embodiment, address mapper 88 is implemented as a table stored in non-volatile memory 44 or in some other memory of memory chip 32 (not shown).

In some embodiments, each data item is assigned one or more storage spaces in each of the logical address space and the physical address space.

In the context of the present disclosure and in the claims, a storage space that comprises multiple addresses is also referred to as a "storage location." A physical storage location comprises multiple physical addresses in the physical address space, and a logical storage location comprises multiple logical addresses in the logical address space. In some embodiments, the addresses in a storage location occupy a contiguous range of addresses in the relevant address space. Alternatively, the addresses in a storage location are non-contiguous in the relevant address space. In the description that follows, the terms "storage space" and "storage location" are used interchangeably.

In FIG. 2, application program APP1 of FIG. 1 is assigned two storage spaces denoted SEC_1L and SEC_2L in the logical address space, and two storage spaces denoted SEC_1P and SEC_2P in the physical address space.

In some embodiments, logical addresses of SEC_1L, denoted LA1, serve for reading the currently installed version of APP1 from the memory chip, whereas logical addresses of SEC_2L, denoted LA2, serve for writing an updated version of APP1 to the memory chip. The currently used version of APP1 may be stored in SEC_1P or in SEC_2P of the non-volatile memory.

When the currently used version of APP1 is stored in SEC_1P, address mapper 88 maps logical addresses LA1 to physical addresses PA1 for reading application program APP1 from the SEC_1L. When the memory controller receives an updated version of application program APP1, via logical addresses LA2 the address mapper maps logical addresses LA2 to physical addresses PA2 for writing the updated version of APP1 into SEC_2P.

Similarly, the currently used version of APP1 may be stored in SEC_2P of the non-volatile memory and accessed for read by the address mapper mapping logical addresses LA1 to physical addresses PA2. In this case, the memory controller writes the updated version of APP1 in SEC_1P by mapping logical addresses LA2 to physical addresses PA1 using address mapper 88. Table 1 summarizes selected logical-to-physical mapping alternatives.

TABLE 1

Logical-to-physical address mapping

| Data item (APP1):<br>stored in SEC_1P<br>updated in SEC_2P | For read map:<br>LA1 to PA1 | For write map:<br>LA2 to PA2 |
|---|---|---|
| Data item:<br>stored in SEC_2P<br>updated in SEC_1P | For read map:<br>LA1 to PA2 | For write map:<br>LA2 to PA1 |

By using two separate storage spaces for each data item (e.g., APP1), the memory controller can read the currently installed version of a data item from one storage space of the non-volatile memory, and write a version of the data item received for replacing the currently used data item into a different storage space of the non-volatile memory.

The memory controller actually replaces the currently used version by the received version only after validating the integrity and authenticity of the received version identifier and that the version of the received data item is more recent than the currently used version. In some embodiments, the memory controller replaces the currently used data item with the updated (and authenticated) version of the data item by swapping the logical-to-physical address mapping of SEC_1P and SEC_2P. After the swapping, the memory controller can read the updated version of the data item via logical addresses LA1. In addition, the memory controller may write data to the storage space of the obsolete version via logical addresses LA2.

In some embodiments, the storage spaces are allocated so that each physical address in SEC_1P has a corresponding physical address in SEC_2P so that these two physical addresses differ only in the Most Significant Bit of the physical address space. In such embodiments, the address mapper swaps between SEC_1P and SEC_2P, by inversing the MSB of the physical addresses, thus achieving minimal latency in performing address re-mapping.

The configurations of user device 24 and memory chip 32 in FIGS. 1 and 2 are example configurations, which are chosen purely for the sake of conceptual clarity. In alternative embodiments, any other suitable configurations of a user device and a memory chip can also be used. The different elements of memory chip 32, such as memory controller 48, non-volatile memory 44 and cryptographic engine 56, may be implemented using any suitable hardware, such as in an Application-Specific Integrated Circuit (ASIC) or Field-Programmable Gate Array (FPGA). In some embodiments, some elements of memory chip 32 can be implemented using software, or using a combination of hardware and software elements.

In some embodiments, certain elements of memory chip 32, such as memory controller 48, may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In user device 24, host 28 and memory chip 32 may each comprises a separate semiconductor die, and the two dies reside on a common package or on separate packages. In some embodiments, memory controller 48, non-volatile memory 44 and cryptographic engine 56, all reside in a common die comprising memory chip 32.

Methods for Secure Updating of Data Items in Memory Chip

Figure 3:
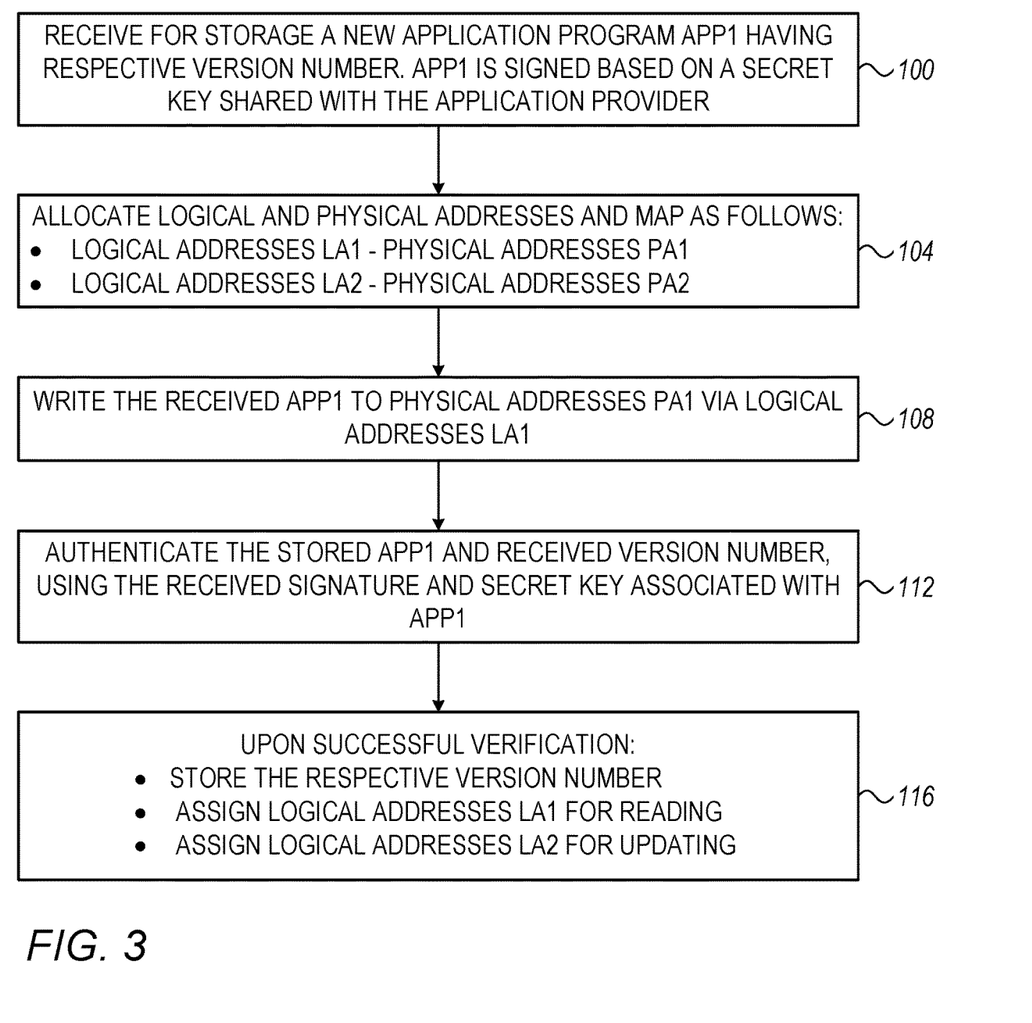
FIG. 3 is a flow chart that schematically illustrates a method for securely storing a new data item, in accordance with an embodiment that is described herein.

FIG. 3 is a flow chart that schematically illustrates a method for securely storing a new data item, in accordance with an embodiment that is described herein. The method can be executed, for example, by memory controller 48 of memory chip 32. The method of FIG. 3 is described mainly with reference to data item APP1 (60A) of FIGS. 1 and 2. The method is similarly applicable, however, to data items of any other suitable type. In the method of FIG. 3, the version identifiers comprise version numbers.

The method begins with memory controller 48 receiving for storage application program APP1, at a reception step 100. In the present example we assume that APP1 is not yet installed in memory chip 32. The memory controller additionally receives for APP1 respective version number and signature. When APP1 originates by an authorized provider, e.g., PROVIDER1 (64A) in the present example, the authorized provider has assigned version number VER1 (62A) to APP1, and has calculated the signature over APP1, and the version number using secret key KEY1 (80A), which the memory chip shares with PROVIDER1.

At an address allocation step 104, the memory controller allocates for APP1 logical addresses LA1 and LA2 in logical storage locations SEC_1L and SEC_2L, respectively. The memory controller maps, using address mapper 88, logical addresses LA1 and LA2 to respective physical addresses PA1 and PA2 of respective physical storage locations SEC_1P and SEC_2P in the non-volatile memory. In some embodiments, the memory controller initializes a descriptor (90A) for APP1 in the non-volatile memory.

At a writing step 108, the memory controller unlocks physical addresses PA1 for writing, e.g., using the accessing rights in descriptor 90A of APP1, and writes the received data item APP1 to physical addresses PA1 of physical storage location SEC_1P via logical addresses LA1 of logical storage location SEC_1L.

At a verification step 112, the memory controller verifies the authenticity and integrity of APP1 that was stored in physical addresses PA1. To this end, the memory controller calculates the signature over the stored APP1, including the received version number, and compares to the signature received at step 100. If the calculated signature and the received signature match, APP1 and its received version number are authenticated successfully.

At an initialization step 116, in response to a successful verification at step 112, the memory controller stores the received version number VER1 of APP1, e.g., in the respective descriptor 90A. The stored version number will be used as a reference version identifier for accepting subsequent updates of APP1 that are issued by PROVIDER1 for download later than APP1. The memory controller further assigns logical addresses LA1 (of logical storage location SEC_1L) for reading APP1, and logical addresses LA2 (of logical storage location SEC_2L) for writing updated versions of APP1, by setting the read and write accessing rights indicators in descriptor 90A. Following step 116, the method terminates.

Figure 4:
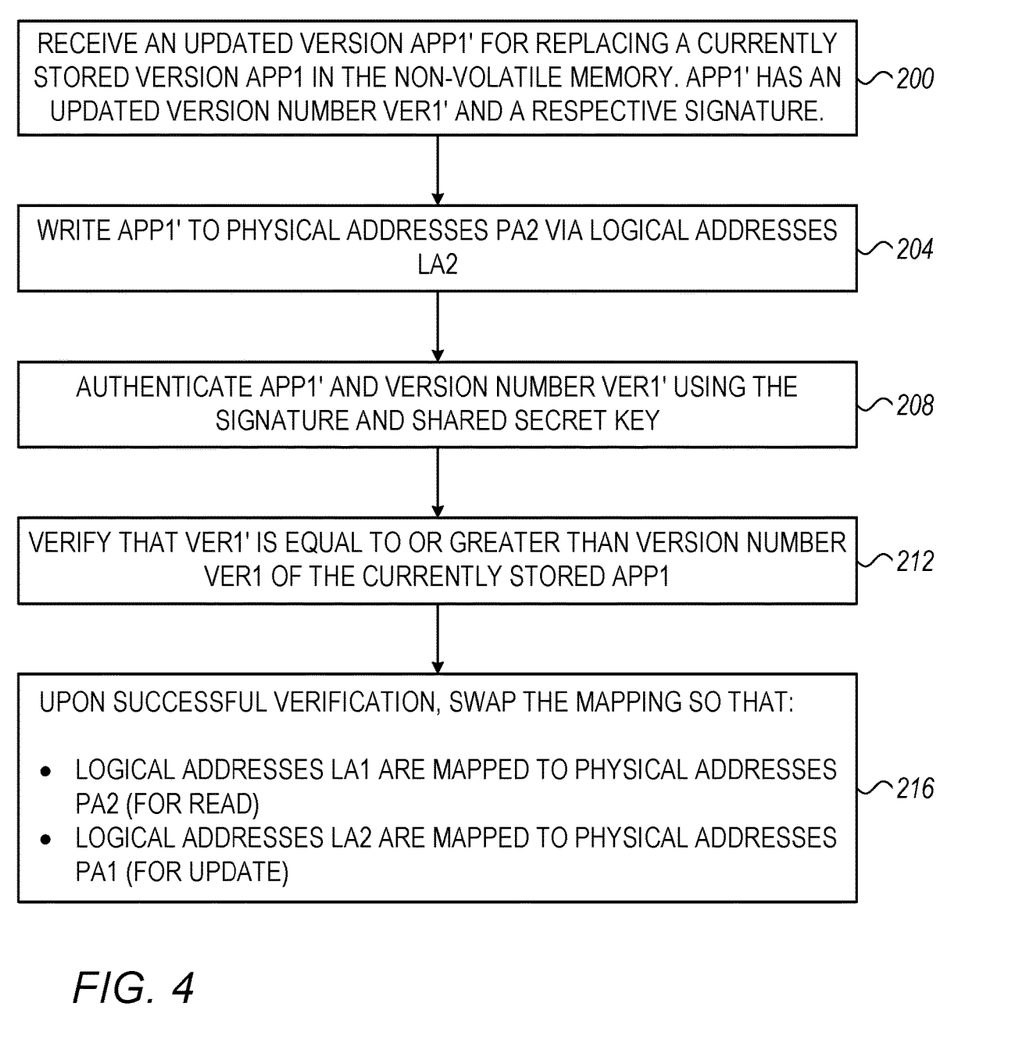
FIG. 4 is a flow chart that schematically illustrates a method for securely updating a stored data item, in accordance with an embodiment that is described herein.

FIG. 4 is a flow chart that schematically illustrates a method for securely updating a stored data item, in accordance with an embodiment that is described herein. The method can be executed, for example, by memory controller 48 of memory chip 32. In describing the method of FIG. 4, we assume that application program APP1 was already installed in the memory chip, e.g., using the method of FIG. 3, and occupies physical addresses PA1 of physical storage location SEC_1P. The method is similarly applicable, however, to data items of any other suitable type. In the method of FIG. 4, the version identifiers comprise version numbers.

The method begins, at a reception step 200, with memory controller 48 receiving an updated version APP1' for replacing version APP1 that is currently stored in physical addresses PA1 of physical storage location SEC_1P in the non-volatile memory. The memory controller additionally receives for APP1' a respective updated version number VER1' and a respective signature.

When APP1 originates by an authorized provider that shares KEY1 with the memory chip (PROVIDER1 in case of APP1), the authorized provider has assigned the updated version number VER1' to APP1', and has calculated the signature over APP1' and VER1' using secret key KEY1 (80A). Moreover, the authorized provider assigns the updated version number VER1' so that VER1'>VER1, i.e., greater than the version number of the currently installed version of APP1.

At a writing step 204, the memory controller writes the received updated version APP1' to physical addresses PA2 of physical storage location SEC_2P via logical addresses LA2 of logical storage location SEC_2L. At a validation step 208, the memory controller authenticates APP1' and updated version number VER1' using the signature received at step 200 and secret key KEY1 associated with data item APP1. The memory controller performs the authentication similarly to step 112 of FIG. 3 above, but for APP1' in physical addresses PA2 of physical storage location SEC_2P.

At a version number verification step 212, in response to detecting that VER1' was authenticated successfully, the memory controller further validates that VER1' is equal to or greater than VER1, i.e., the version number of APP1 currently stored. Since only the authorized provider possesses the relevant shared key (KEY1) and can sign APP1 and a selected version number, the validations at steps 208 and 212 provide protection against roll-back attacks.

At a swapping step 216, upon successful authentication at step 208, and successful validation at step 212, the memory controller re-maps the logical-to-physical addresses. Specifically, address mapper 88 maps logical addresses LA1 of logical storage location SEC_1L to physical addresses PA2 of physical storage location SEC_2P (in which the updated version APP1' is now stored), and maps logical addresses LA2 of logical storage location SEC_2L to physical addresses PA1 of physical storage location SEC_1P, for writing a subsequent update of APP1, when available.

In some embodiments, the memory controller updates a data item using a single atomic operation. In such embodiments the memory controller executes steps 208, 212 and 216 above as an interruptible operation comprising: authenticating the version identifier to produce an authentication result (step 208), comparing between the received and stored version numbers (step 212), and conditionally replacing the stored data item with the received data item based on the authentication result and on the comparison (step 216). This embodiment ensures that the memory controller actually updates the data item only when all the required conditions are satisfied.

The embodiments described above are given by way of example, and other suitable embodiments can also be used. For example, although in the embodiments describe above data items are assigned two storage spaces in the non-volatile memory, in alternative embodiments a data item can be associated with more than two storage spaces, e.g., for storing multiple versions of the data item.

In the embodiments described above we generally assumed that the shared key (e.g., KEY1 80A) is the same at the provider side and memory chip. In alternative embodiments, non-symmetrical keys can be shared that support signing a data item at the provider side and verifying the authenticity of the data item at the memory chip.

Although in the embodiments described above shared keys such as KEY1 80A and KEY2 80B are used for authentication, these keys or other keys, e.g., derived from KEY1 and KEY2, can be used for end-to-end encryption of the data items sent over the communication network.

In the embodiments described above we mainly refer to two logical storage locations per data item (i.e., SEC_1L and SEC_2L), wherein one of the logical storage locations uses for reading the data item and the other uses for writing an updated version of the data item. This configuration is, however, not mandatory, and in alternative embodiments, the two logical storage locations may swap roles (e.g., dynamically) between reading and writing.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A secured storage system, comprising:

a memory chip;

a non-volatile memory on the memory chip, having one or more sections defined therein and configured to store, for each section, a version identifier;

an access controller on the memory chip, configured to:
allocate on the non-volatile memory, for each data item of a plurality of data items, first and second storage spaces;

manage an address mapper table which maps between logical addresses in a logical address space and physical addresses of the storage spaces in the non-volatile memory;

translate logical addresses in commands directed to the non-volatile memory into physical addresses; and receive swap commands for swapping, in the address mapper table, between the physical addresses of the first and second storage spaces of a specific data item and the corresponding logical addresses of the first and second storage spaces, and in response to each received swap command to determine that a condition is met and to swap the physical addresses only if the condition is met, wherein the logical addresses of the first and second storage spaces of each data item include a logical address of a current version of the data item and a logical address of an update version of the data item, wherein the condition comprises verifying that a second version identifier of the storage space currently associated with the logical address of the update version of the data item is greater than a first version identifier of the storage space currently associated with the logical address of the current version of the data item.

2. The storage system according to claim 1, wherein the access controller is configured to determine that the condition is met and to swap the physical addresses, in a single uninterruptible operation.

3. The storage system according to claim 1, wherein the controller is configured to authenticate the second version identifier based on a secret key that the controller shares with a provider of the data item.

4. The storage system according to claim 3, wherein the controller is configured to calculate a signature for the storage space currently associated with the logical address of the update version of the data item to produce a calculated signature, based on the secret key and on at least the second version identifier, and to check whether or not the calculated signature matches a received signature, received for the update version of the data item.

5. The storage system according to claim 1, wherein the controller is configured to execute write commands only after verifying a respective command signature using a secret key that is associated with the data in the executed write command.

6. The storage system according to claim 1, wherein the condition additionally comprises verifying that the second version identifier is successfully authenticated.

7. The storage system according to claim 1, wherein the condition additionally comprises verifying that the data in the storage space currently associated with the logical address of the update version is successfully authenticated to a signature received with the swap command.

8. The storage system according to claim 1, wherein the physical addresses of the first and second storage spaces differ only in a single bit.

9. The storage system according to claim 1, wherein the access controller comprises a hardware controller.

10. A method for secured storage, comprising:
storing a version identifier for each section of one or more sections in a non-volatile memory in a storage system on a memory chip;
allocating on the non-volatile memory, for each data item of a plurality of data items, first and second storage spaces;
managing an address mapper table which maps between logical addresses in a logical address space and physical addresses of the storage spaces in the non-volatile memory;
receiving, by an access controller on the memory chip, a swap command for swapping, in the address mapper table, between the physical addresses of the first and second storage spaces of a specific data item and the corresponding logical addresses of the first and second storage spaces, and in response to the received swap command performing:
determining that a condition is met; and
swapping the physical addresses only if the condition is met,
wherein the logical addresses of the first and second storage spaces of each data item include a logical address of a current version of the data item and a logical address of an update version of the data item,
wherein determining that the condition is met comprises verifying that a second version identifier of the storage space currently associated with the logical address of the update version of the data item is greater than a first version identifier of the storage space currently associated with the logical address of the current version of the data item.

11. The method according to claim 10, wherein determining that the condition is met and swapping the physical addresses are performed in a single uninterruptible operation.

12. The method according to claim 10, wherein determining that the condition is met further comprises authenticating the data item by verifying that a signature received with the swap command matches the data item, based on a secret key that the storage system shares with a provider of the data item.

13. The method according to claim 12, wherein verifying the signature comprises calculating the signature for the data item to produce a calculated signature, based on the secret key and on at least the second version identifier, and checking whether or not the calculated signature matches the received signature.

14. The method according to claim 12, further comprising receiving write commands and executing each write command, in the non-volatile memory, only after verifying a respective command signature using a secret key that is associated with the data in the executed write command.

15. The method according to claim 10, wherein determining that the condition is met additionally comprises verifying that the second version identifier is successfully authenticated.

16. The method according to claim 10, wherein determining that the condition is met additionally comprises verifying that the second data item is successfully authenticated to a signature received with the swap command.

17. The method according to claim 10, further comprising performing in response to the received swap command changing a second logical address which corresponded to the new physical address to the current physical address, if the condition was met.

18. The method according to claim 10, wherein the new physical address and the current physical address differ only in a single bit.

19. The method according to claim 10, wherein the access controller comprises a hardware controller.

* * * * *